United States Patent
Di Giglio et al.

(10) Patent No.: US 8,214,504 B2
(45) Date of Patent: Jul. 3, 2012

(54) METHOD OF ESTABLISHING A CONNECTION ON A COMMUNICATION NETWORK

(75) Inventors: Andrea Di Giglio, Turin (IT); Antonio Manzalini, Turin (IT)

(73) Assignee: Telecom Italia S.p.A., Milan (IT)

( * ) Notice: Subject to any disclaimer, the term of this patent is extended or adjusted under 35 U.S.C. 154(b) by 741 days.

(21) Appl. No.: 11/990,002

(22) PCT Filed: Aug. 5, 2005

(86) PCT No.: PCT/IB2005/002492
§ 371 (c)(1),
(2), (4) Date: Apr. 23, 2009

(87) PCT Pub. No.: WO2007/017708
PCT Pub. Date: Feb. 15, 2007

(65) Prior Publication Data
US 2009/0222563 A1 Sep. 3, 2009

(51) Int. Cl.
*G06F 15/16* (2006.01)
(52) U.S. Cl. ........................... 709/227; 709/237
(58) Field of Classification Search .................. 709/227, 709/237
See application file for complete search history.

(56) References Cited

U.S. PATENT DOCUMENTS

| | | |
|---|---|---|
| 6,366,577 B1 | 4/2002 | Donovan |
| 6,643,690 B2 * | 11/2003 | Duursma et al. ............. 709/217 |
| 6,765,918 B1 | 7/2004 | Dixon et al. |
| 2002/0114274 A1 | 8/2002 | Sturges et al. |
| 2003/0128826 A1 | 7/2003 | Benini et al. |
| 2004/0022191 A1 | 2/2004 | Bernet et al. |

FOREIGN PATENT DOCUMENTS

WO WO-02/44919 A1 6/2002

OTHER PUBLICATIONS

Camarillo et al., "Integration of Resource Management and Session Initiation Protocol (SIP);" Network Working Group, Request for Comments: 3312, IETF Standard, Internet Engineering Task Force, IEFT, pp. 1-31, (2000).
Veltri et al., "SIP Extensions for QoS Support;" IEFT Standard-Working-Draft, Internet Engineering Task Force, IEFT, pp. 1-43, (2002).

* cited by examiner

*Primary Examiner* — Larry Donaghue
*Assistant Examiner* — Marshall McLeod
(74) *Attorney, Agent, or Firm* — Finnegan, Henderson, Farabow, Garrett & Dunner, L.L.P.

(57) ABSTRACT

A method of establishing connections between at least a first and a second terminal on a communication network includes: sending to the second terminal a network signal requesting the network availability to establish the connection and a terminal signal requesting the availability of the second terminal to run an application exchanging data between the first and second terminals; receiving at the second terminal the network signal and the terminal signal; and sending on the network a response signal carrying information based on the network and terminal signals and assuming a content corresponding to the availability/unavailability of the network to establish the connection combined the availability/unavailability of the second terminal to run the application.

42 Claims, 7 Drawing Sheets

METHOD OF ESTABLISHING A CONNECTION ON A COMMUNICATION NETWORK

CROSS REFERENCE TO RELATED APPLICATION

This application is a national phase application based on PCT/IB2005/002492, filed Aug. 5, 2005.

BACKGROUND OF THE INVENTION

1. Field of the Invention

The present invention relates to a method of establishing connections between at least two communication terminals in order to run an application requiring the exchange of data between said terminals. As an example, the present invention relates to interactive applications, in particular, of the multimedia type.

To the purpose of the present invention by the expression "interactive application running between two or more terminals" it is meant an application, typically a software application, wherein at each terminal a transition from an application status to another application status is also dependent on data received by another terminal.

To the purpose of the present by the expression multimedia application it is meant an application in which are involved any combination of two or more of the following elements: text, image, sound, speech, video and software.

2. Description of the Related Art

Examples of known interactive multi-media applications are on interactive multimedia gaming, video conference, telepresence (i.e. an application requiring high definition video communications and acquisition of images by a video camera). Normally the users of such applications are provided with terminals (for both fixed and mobile access) comprising a local elaborating device (for example, a personal computer or elaborating functions inside a cellular device) connected to peripheral equipments such as a game console, a high definition TV for tele-presence and/or a video-camera. The local elaborating device allows to run the application in executing a specific software.

According to known technologies, the user terminal can be connected by means of a communication network to a further user terminal assigned to another user. As an example, for connecting the terminals involved in interactive multi-media applications are employed the following conventional communication networks: circuit-switched networks (operating, for example, according to a Time Division Multiplexing technique, TDM) or packet-switched networks (operating, for example, according an Internet Protocol, IP). The connection of the user terminals to the network is normally performed by a fixed access network (e.g. dial-up, Digital Subscriber Line DSL, cable) and/or mobile and/or nomadic access network (e.g. Wireless Fidelity WiFi, World Wide Interoperability for Microwave Access WiMax, Global System for Mobile Communications GSM, General Packet Radio Service GPRS, Universal Mobile Telecommunications System UMTS).

The exchange of data between the two user terminals (such as the exchange of digital images in a video-conference), associated with the running of the multimedia interactive application, can occur only when the network has established a suitable connection between the two terminals and the applications are available for exchanging data. This connection can be established when the networks elements (e.g. access nodes or the core network) are available to provide their resources for the connection to be established.

Document U.S. Pat. No. 6,765,918 describes a method for establishing a connection in a telecommunication network that provides allocation of bandwidth to carry voice, data and video signals between users and the network. The network comprises a plurality of multimedia channel banks connected to users equipments including telephones, computers, set-top boxes, apparatus for producing video signals. The network is also provided with a multimedia resource manager acting as real time proxy and resource manager capable of responding to several trigger i.e. script, network signaling, end-user signaling.

Document US-A-2002-0114274 discloses a packet-based network providing interactive voice, video and multimedia applications. This network includes a backbone network, a network server, access or edge routers and local servers. This document describes a method for setting up a session according to which a local server receives a request for service and, according to an example, requests access from the backbone network. The network server resolves the destination IP (Internet Protocol) address and receives access confirmation. Subsequently to the access confirmation, the set up of the application is carried out by means of a Session Initiation Protocol, SIP. The SIP protocol is a known terminal-based signaling protocol.

Document WO-A-02-44919 describes an IP communication network coupled to equipments of a number of customers. The network is provided with a core communication links, customer routers and a network access system that distributes the function of traditional edge routers between three logical modules: a programmable access device, an external processor and an access router. The external processor performs, inter alia, the signaling to set up and tear down access network connections. This document illustrates a network-level signaling utilizing the known Resource Reservation Protocol (RSVP) and an application-level signaling using the above mentioned SIP.

SUMMARY OF THE INVENTION

The Applicant has noticed that the conventional technologies, shortly indicated above, do not operate in efficient manner with reference to the steps needed to establish (i.e. to set up) the connection between the two terminals and to start the running of the application involving such terminals. Particularly, the Applicant has addressed a problem of providing a method of establishing a connection on a communication network in order to run an application involving two terminals, which results more efficient than the conventional methods in respect to the managing of the network resources employed.

In accordance with the invention, advantages connected to the managing of the network resources have been obtained by a method of controlling establishing of a connection between at least a first and a second terminal on a communication network, comprising:

sending on the network and toward the second terminal a network signal requesting the network availability to establish said connection and a terminal signal requesting the availability of the second terminal to run an application exchanging data between said first and second terminals;

in a first operating condition, receiving at the second terminal the network signal and the terminal signal;

generating at the second terminal an application response signal representative of the availability/unavailability of the second terminal to run the application;

elaborating at the second terminal the network signal and the application response signal so as to generate a response signal carrying information indicative of the availability/unavailability of the network to establish the connection combined with the availability/unavailability of the second terminal to run the application; and sending said response signal on the network toward the first terminal.

In further embodiments of the method of the present invention, said network may include a plurality of nodes to be employed for carrying out the connection, the method further comprising predisposing to the connection the plurality of nodes by means of said network signal sent to the second terminal;

wherein said information may assume a first value corresponding to a first state of said first operating condition in which the network is available to establish the connection and the second terminal is unavailable to run the application, in such first state the method comprising releasing of the connection by sending on the network the response signal carrying the first value; or wherein said information may assume a second value corresponding to a second state of said first operating condition in which the network is available to establish that the connection and the second terminal is available to run the application, in such second state, the method comprising establishing of the connection by sending on the network the response signal carrying the information assuming the second value; or wherein said predisposition may include reservation of the nodes resources for the connection; or wherein said predisposition may include configuration of the nodes resources for the connection; or may further comprise:

receiving said information at the first terminal, the information having the second value; and running the application at the first and the second terminals.

In other embodiments of the method of the present invention, after having received at the second terminal one between the network signal and the terminal signal, waiting for the other signal between the network signal and the terminal signal, the waiting may be performed in a time period having a pre-established duration.

The method of the present invention may also comprise the generation of the response signal in which the information assumes the first value also in a second operating condition in which the network is available to establish the connection and the terminal signal does not reach the second terminal within such pre-established duration; or the network signal and the terminal signal may carry a same identification information associated with a specific connection to be established and a specific application to be run; or said plurality of nodes may include access, metro nodes, or core nodes.

In still other preferred embodiments of the method of the present invention, said application to be run on the first and second terminals may include broadband application; or said application may be an interactive application; or said application may be a multimedia application; or said application may comprise at least one of the following applications: video-conference, multi-media gaming, and tele-presence; or the method of the present invention may further comprise:

generating a first application requesting signal by a first application section of said first terminal; and elaborating said application request signal at a first elaborating device of said first terminal for generating the terminal signal; and may further comprise:

receiving at the first elaborating device said first application requesting signal; and elaborating said first application requesting signal at the first elaborating device for generating the first signal; or the generation of the application response signal may include:

receiving at a second elaborating device of said second terminal the terminal signal;

elaborating at the second elaborating device the terminal signal and sending to a second application section of the second terminal a second application requesting signal;

generating at the second application section the application response signal responding to the second application requesting signal;

sending the second application response signal to the second elaborating device; and elaborating at the second elaborating device the application response signal and the network signal.

In certain other embodiments of the method of the present invention, the network signal and the response signal may be adapted to interact with a network-based control plane;

the terminal signal may be adapted to interact with a terminal-based control plane;

the network signal may carry network data corresponding to parameters of the connection to be set up; and the terminal signal may carry application data corresponding to parameters of the application to be run;

which may include the receiving at the first terminal of said application data from a data-base external to said first terminal;

wherein said external data-base may belong to a service plane of the network.

According to another aspect, the present invention relates to a communication device connectable to a requesting communication device by means of a communication network, comprising;

a receiver adapted to be connected to the network for receiving, in a first operating condition, a network signal indicating the network availability to establish said connection and a terminal signal requesting the availability to run an application exchanging data between the communication device and the requesting device; comprising:

an elaborating device associated with the receiver adapted to receive an application response signal representative of the availability/unavailability of the communication device to run the application, the elaborating device being further adapted to elaborate the network signal and the application response signal so as to generate a response signal carrying information indicative of the availability/unavailability of the network to establish the connection combined with the availability/unavailability of the communication device to run the application; and a transmitter associated with the elaborating device for sending on the network and toward the requesting device the response signal.

In particular embodiments of the communication device of the present invention, said information may be capable of assuming a first value corresponding to a first state of said first operating condition in which the network is available to establish the connection and the communication device is unavailable to run the application, in such first state the response signal being suitable to produce the releasing of the connection; or said information may be capable of assuming a second value corresponding to a second state of said first operating condition in which the network is available to establish the connection and the communication device is available to run the application;

wherein said response signal carrying the second value may be suitable to produce the establishing of the connection.

In other embodiments of the present invention, the communication device may further comprise an application section associated with said elaborating device for running said application, said application section being further capable of generating said application response signal;

wherein the receiver, the elaborating device and the transmitter may be housed in a first container separated from a second container housing part of the application section, the first and second container being provided with interconnecting lines for the exchanging of signals; or wherein the receiver, the elaborating device, the transmitter and the application section may be housed in a common container; or wherein said application section may include apparatuses for the execution of interactive multimedia applications; or wherein said application section may be adapted for the execution of interactive applications.

According to a further aspect, the present invention relates to a communication system comprising a first terminal, a second terminal and a communication network for establishing a connection between the first and the second terminals, the second terminals comprising:

a receiver connection to the network for receiving a network signal indicating the network availability to establish said connection and a terminal signal requesting the availability to run an application exchanging data between the first and the second terminal;

the second terminal comprising;

an elaborating device associated with said receiver adapted to generate an application response signal representative of the availability/unavailability of the second terminal to run the application; the elaborating device being adapted to elaborate the network signal and the application response signal so as to generate a response signal carrying information indicative of the availability/unavailability of the network to establish the connection combined with the availability/unavailability of the second terminal to run the application; and a transmitter associated with the elaborating device for sending on the network and toward the first terminal the response signal carrying said information.

In preferred embodiments of the system of the present invention, said network may include a plurality of nodes predisposed for carrying out the connection, when said information is capable of assuming a first value corresponding to a first operating state in which the network is available to establish the connection and the second terminal is unavailable to run the application, in such first state said response signal being suitable to produce the releasing of the connection; or said information may be further capable of assuming a second value corresponding to a second operating state in which the network is available to establish the connection and the second terminal is available to run the application;

wherein said response signal carrying the second value may be suitable to produce the establishing of the connection; or wherein the predisposed nodes may have resources reserved for the connection; or wherein the predisposed nodes may be configured for the connection; or wherein the network signal and the response signal may be configured in accordance with a network-based signaling protocol and the terminal signal may be configured in accordance with a terminal-based signaling protocol;

wherein the network-based signaling protocol may be the resource reservation protocol-traffic engineering; or wherein the terminal-based signaling protocol may be the session initiation protocol.

In other preferred embodiments of the system of the present invention, said network may be configured in accordance with at least one of the following communication technologies: connection-oriented circuit-switched network, or connection-oriented packet-switched network;

wherein said connection-oriented packet-switched network may be configured in accordance with one of the following technologies: frame relay, multiprotocol label switching, MPLS, asynchronous transfer mode, ATM, or generalized multiprotocol label switching, GMPLS; or wherein said connection-oriented circuit-switched network may be configured in accordance with one of the following technologies: synchronous digital hierarchy, SDH, time division multiplexing, TDM, optical transport network, OTN, or generalized multiprotocol label switching, GMPLS.

BRIEF DESCRIPTION OF THE DRAWINGS

Further features and advantages of the present invention will emerge more clearly from the following detailed description of preferred embodiments thereof provided by way of example in the accompanying drawings in which.

DETAILED DESCRIPTION OF THE INVENTION

Figure 1:
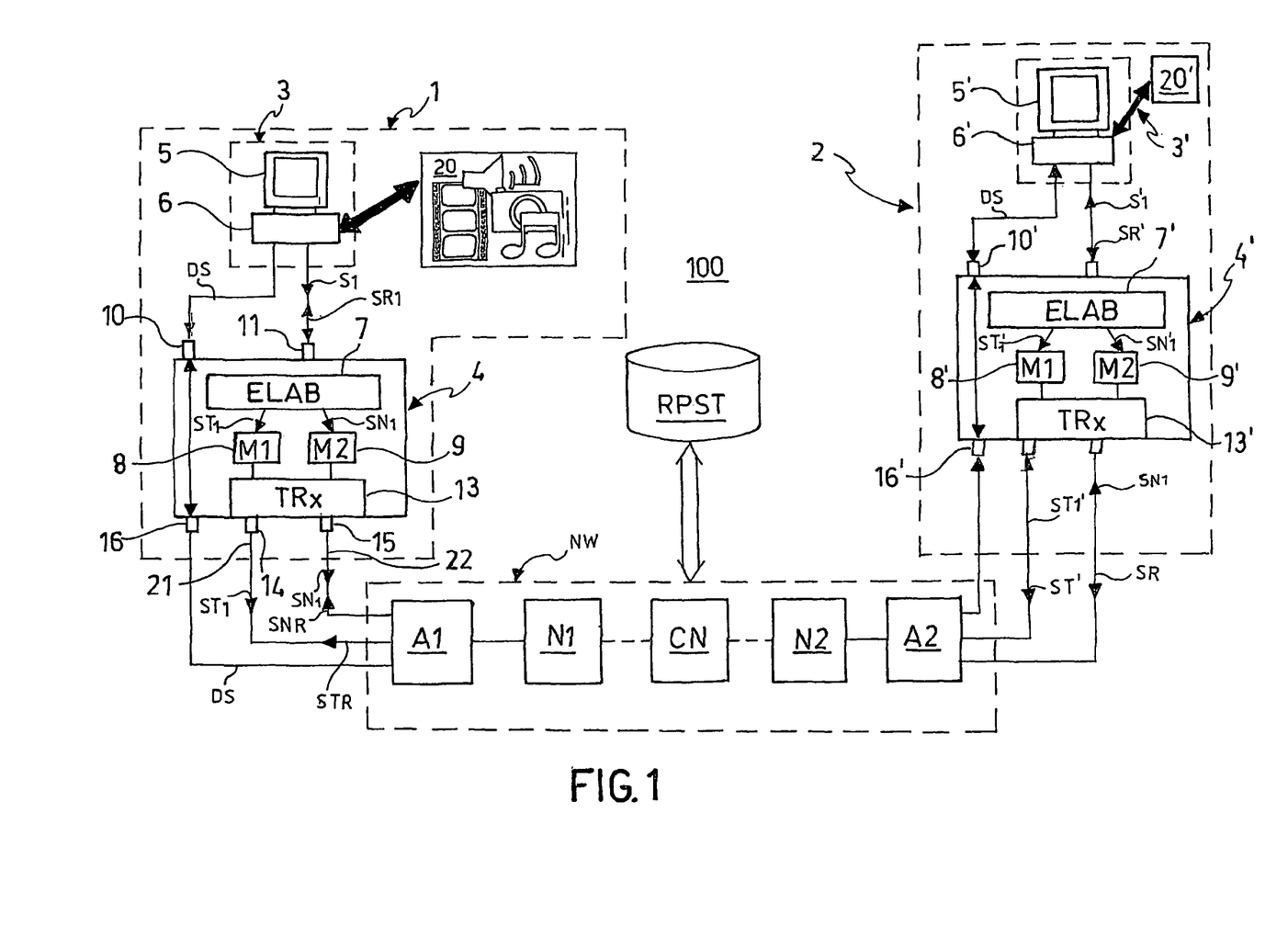
FIG. 1 shows in schematic form a communication system according to an embodiment of the invention.

FIG. 1 shows a communication system 100 in accordance with a particular embodiment of the invention and comprising at least a first terminal 1 and at least a second terminal 2, both connectable to a communication network NW.

The communication system 100 allows to set-up a connection between the first 1 and the second 2 terminals during which said terminals run an application exchanging data each other. The application to be run on the first 1 and second 2 terminals is, preferably, an interactive multi-media application such as, for example, multimedia gaming, video-conference and tele-presence. Even if only two terminals are shown in FIG. 1, the present invention is also applicable to multi-casting transmissions, wherein the information/data associated to the application are transmitted to several terminals at the same time belonging to a specific group of users.

With reference to the communication network NW, which can be of a conventional type, it is configured, as an example, in accordance with one of the following modalities of providing communications: connection-oriented circuit-switched network, and connection-oriented packet-switched network.

As well known to the skilled person, in a connection-oriented circuit-switched network, a path based on a physical link (for example, a link associated to an optical wavelength or a Time Division Multiplexing timeslot) is established and dedicated for the duration of the connection. Examples of connection-oriented circuit-switched networks employable to implement the network NW of the present invention are: Synchronous Digital Hierarchy SDH, Time Division Multiplexing TDM, Optical Transport Network OTN, the circuit-switched layer of Generalized MultiProtocol Label Switching GMPLS.

In connection-oriented packet-switched networks, virtual connections are established and maintained until connectivity is no longer required (regardless of whether the data has been transmitted or not). Examples of connection-oriented packet-switched technologies employable to implement the network NW of the present invention are: Frame Relay, MultiProtocol Label Switching MPLS, Asynchronous Transfer Mode ATM, the packet-switched layer of Generalized MultiProtocol Label Switching GMPLS.

As will be clarified in the following, the Generalized MultiProtocol Label Switching GMPLS technology is a particularly advantageous network solution as it can operate both as a connection-oriented circuit switched and connection-oriented packet switched network. Therefore, the network NW will be considered implemented in accordance with the preferable GMPLS approach.

As known, GMPLS extends to the circuit switching the MultiProtocol Label Switching MPLS, which supports exclusively packet switching. As an example, GMPLS provides the additional support for TDM, optical wavelength, and fiber switching.

In short, the Multiprotocol Label Switching MPLS is a method for forwarding packets (frames) through a network: specifically it enables routers at the edge of a network to apply labels to packets (frames) thus allowing to rapidly and effectively routing the packets. The routers operating in accordance with the MPLS technologies are denominated LSR (Label Switch Routers). A Label Switched Path (LSP) is a specific path traffic through a MPLS or a GMPLS network.

GMPLS is an extension of MPLS supporting not only devices that perform packet switching, but also those that perform TDM, wavelength, and fiber (port) switching. The support for the additional types of switching has driven GMPLS to extend certain base functions of traditional MPLS and, in some cases, to add functionality. Also the routing devices operating in accordance to a GMPLS approach are indicated with the initials LSR. These changes and additions impact basic LSP properties, how labels are requested and communicated, the unidirectional nature of LSPs, how errors are propagated, and information provided for synchronizing the ingress and egress LSRs. The MPLS architecture was defined to support the forwarding of data based on a label while with GMPLS the architecture has been extended to include LSRs whose forwarding plane recognizes neither packet, nor cell boundaries, and therefore, can't forward data based on the information carried in either packet or cell headers. Specifically, such LSRs include devices where the forwarding decision is based on time slots, wavelengths, or physical ports.

Moreover, the GMPLS architecture separates the Control Plane from the Forwarding Plane. The Control Plane performs the call control and connection control functions. Through signaling, the Control Plane sets up and releases connections, and may restore a connection in case of a failure. The Forwarding Plane performs the forwarding of data carried by the Label Switched Paths (LSPs).

In addition, GMPLS also clearly separates the Control Plane in two parts, the Signaling Plane containing the signaling protocols and the Routing Plane containing the routing protocols.

Particularly, the Signaling Plane of the GMPLS performs the so-called network-based signaling, necessary for call control and connection control functions of connections at the network level.

With reference to the schematization of FIG. 1, the GMPLS network NW includes a first access node A1, connected to the first terminal 1, and a second access node A2 connected to the second terminal 2. In accordance with the GMPLS technology, the first A1 and the second A2 access nodes may be Label Switch Routers (LSRs). Each of the access nodes A1 and A2 may be connected, respectively, also to further terminals (not shown in the figures).

Moreover, the network NW includes a plurality of further nodes such as conventional metro nodes N1 and N2 (respectively, connected to the access nodes A1 and A2) and core nodes included in a core network schematized by the block CN.

The first terminal 1 is a device which comprises a first application section 3 operatively connected to a first local communication device 4. The first application section 3 includes one or more apparatuses allowing a first user (as an example, a subscriber) to run or execute a particular application, such as at least one of the interactive multi-media applications listed above.

As an example, such first application section 3 may be at least one personal computer or workstation having a display 5, a keyboard (not shown) and a first container 6 housing a processor, a volatile memory, a non volatile memory, a mass memory (e.g. an hard disk) Moreover, the first application section 3 may be connected to peripheral equipments (schematized in FIG. 1 with a block 20) necessary to the user application such as, for example, a game console, a high definition TV for tele-presence and/or a video camera. Furthermore, the first application section 3 is provided with a specific software needed to run the application installed and to manage the peripheral equipments 20.

The first local communication device 4 includes one or more apparatuses which allows to exchange signals with the first application section 3 and with the first access node A1 of the network NW and, therefore, with the second terminal 2. The first local communication device 4 can either be a stand-alone device (e.g. a commercial computer housed in respective container separated by the container 6) or a software agent stored inside the first application section 3 controlling (with proper protocols) the local resources running applications.

With reference to the particular embodiment of FIG. 1, the first local communication device 4 is a stand-alone apparatus (for example, disposed at the user's residence and, preferably, close by the first application section 3) and it is, advantageously, provided with a console having connections to the personal computer/workstation of the first application section 3. In this case, the first local communication device 4 may comprise a corresponding first elaborating device 7 (ELAB) including a processor (e.g. a microprocessor), volatile and non-volatile memory, mass memory, e.g. a hard disk (not shown).

The first elaborating device 7 is provided with a first client-side data-interface 10 for exchanging with the first application section 3 first data DS, associated with the application to be run. The first data-interface 10 may be a conventional Ethernet technology (e.g. FE or GbE) local communication. Moreover, the first elaborating device 7 is provided with a first signal-interface 11 for exchanging with the first application section 3 local signals S1, associated with a connection to be established with the second terminal 2 to support the application.

As it will be more clear later, the first elaborating device 7 is configured so as to generate and manage, on the basis of the local signal S1, terminal-based signals (e.g. a first terminal-based signal ST1) and network-based signals (e.g. a first network-based signal SN1), corresponding to two different types of signaling: a terminal-based signaling (e.g. according to IP Multimedia Subsystem/Next Generation Network control architecture—IMS/NGN) and a network-based signaling (e.g. according to GMPLS networking/transport architecture).

According to the particular schematization shown in FIG. 1, the first elaborating device 7 is connected to a first terminal-based module 8 (M1) and a first network-based module 9 (M2). The first terminal-based module 8 and the first network-based module 9 allow to elaborate (under the control of the first elaborating device 7) the first terminal-based signal ST1 and the first network-based signal SN1, in accordance with specific protocols supported by the network NW and by the second terminal 2. These modules 8 and 9 may be implemented either by a software agent stored in the first elaborating device 7 or by hardware modules provided with specific software.

The above mentioned first modules 8 and 9 are connected to a first transmitter/receiver or transceiver 13 (TRx), having output/input ports 14 and 15, for performing a conventional treatment of the first terminal-based signal ST1 and the first network-based signal SN1 to allow their transmission on or reception from corresponding output/input lines 21 and 22 connected to the first access node A1. Advantageously, the first transceiver 13 may include devices (e.g. a laser, a photodiode, a modulator) for transmitting/receiving the signals exiting/entering the first modules 8 and 9 (e.g. electrical-to-optical conversion and vice versa, electrical modulation) or may include only the input/output ports 14 and 15 for directly coupling the first modules 8 and 9 to the output/input lines 21 and 22.

As an example, the connection of the first local communication device 4 to the first access node A1 can be a known interface (such as Fast Ethernet) implemented by the first transceiver 13 and the output/input lines 21 and 22. According to the particular embodiment described, the first local communication device 4 is provided with a first network-side data-interface 16 (e.g. implemented with a GbE interface) connected to the first access node A1 and to the first client-side data-interface 10.

The second terminal 2, connected to the second access node A2, is analogous to the first terminal 1 and therefore will not be described in detail. Herein after, the devices/components included in the second terminal 2 will be indicated with the same reference numbers employed to indicate the corresponding devices/components of the first terminal 1 but followed by an apex "'".

Analogously to the first terminal 1, the second terminal 2 is suitable to generate and receive different types of signals associated to a terminal-based signaling and a network-based signaling.

The terminal-based signaling (to which belongs the first terminal-based signal ST1) comprises all the signals/messages exchanged between the first local communication device 4, the first application section 3, the second local communication device 4' and the second application section 3' relating to the availability/unavailability of the two application section 3 and 3' to run the multi-media application supported by a connection established between the same terminals. As an example, the terminal-based signals carry data/information associated to "requests" or "responses" concerning parameters of the application to be run. Particularly, such parameters may be the addresses of the first 1 and the second 2 terminals, the type (e.g. video-conference or game) and the application or terminal peculiarities (e.g. compression algorithms, video resolution, release of the software, type of terminal, etc.) of the multi-media application to be run.

According to the particular embodiment herein described, the first 4 and second 4' local communication devices are configured to manage terminal-based signaling in accordance with the known Session Initiation Protocol, SIP. The SIP protocol has being developed by the SIP Working Group, within the Internet Engineering Task force (IETF) and has been published as IETF RFC 2543. Normally, this signaling protocol has been used for initiating, managing, and terminating voice and video sessions across network. A SIP session involves one or more participants an can use unicast or multicast communication.

The network-based signaling (to which belongs the first network-based signal SN1) comprises all the signals/messages exchanged between the first local communication device 4, the network NW and the second local communication device 4' at least relating to the availability/unavailability of the network NW to establish (i.e. to set up) a connection between the first 1 and the second 2 terminals supporting the multi-media application.

As an example, the terminal-based signals carry data/information associated to "requests" or "responses" concerning parameters of the connection to be established by the network NW. Particularly, such parameters may regard the availability/unavailability of the nodes A1, N1 ... N2, A2 and the core network CN to establish the connection according to particular requirements.

As known to the skilled person, the bandwidth is the amount of data that can be sent through a network connection in a fixed amount of time.

Such requirements are, for example, a pre-established bandwidth and a connection quality.

A GMPLS network allows to provide circuit-switched and packet-switched connection oriented LSPs with a huge set of bandwidth granularities (from some Mbit/s to 100 Gbit/s or more). Thus the GMPLS network permits to support interactive multi-media application employing, for example, high resolution display.

For interactive multi-media application the connection quality can be dependent on the following parameters: packet loss, latency and/or jitter.

A packet loss occurs when packets fail to arrive correctly to the destination terminal (e.g. the second terminal 2). This can be due to insufficient bandwidth along the path (when congestion occurs, routers will drop packets), or possible errors in transmission. The Applicant has noticed that a GMPLS approach allows to provide packet loss suitable for interactive multi-media applications.

Latency is the time delay between an event occurring and the remote-end seeing it (e.g. on the first display 5 of the first terminal 1). For example, for video-conferencing latency is introduced both by the encoding/decoding process, and hence depends on the equipment used, and also by the time it takes packets to traverse the network.

Jitter is the random variation in latency due to situations like competing processes running on the terminal, other traffic temporarily blocking the path through routers along the way, or even the network path changing when running an application. This random variation is one of several situations that cause packets to arrive out of order from their transmitted order. Jitter increases the latency even further. The Applicant has noticed that a GMPLS approach allows providing jitter suitable for interactive multi-media applications.

Moreover, the Applicant has noticed that for applications requiring high bandwidth, low latency, low jitter and connection-oriented network are preferable. For this reason, GMPLS providing LSP (i.e. connection-oriented path) meeting the above requirements, may be appropriate.

According to the particular embodiment herein described, the first 4 and second 4' local communication devices are configured to manage network-based signaling in accordance with the known Resource ReserVation Protocol-Traffic Engineering, RSVP-TE. It has to be observed that the RSVP-TE is a signaling protocol normally required to support the GMPLS technology.

Thus, as it is clear from the description above, the first 4 and second 4' local communication devices are provided with a suitable Control Plane, i.e. software resources which allow to manage both network-based signaling and terminal-based signaling.

With reference to the functions implemented by the terminals, the second transceiver 13' of the second local communication device 4' is configured to receive the first network-based signal SN1, indicating the availability of the network NW to establish a connection between the first 1 and the second 2 terminals, and the first terminal-based signal ST1 requesting the availability of the second terminal to run the application together with the first terminal.

The second elaborating device 7' allows to generate a response signal SR, to be transmitted on the network NW and towards the first terminal 1, carrying an information capable of assuming a first value (a negative answer) corresponding to an operating condition in which the network NW is available to establish the connection but the second terminal 2 is unavailable to run the application.

Alternatively, the response signal SR may carry an information assuming a second value (affirmative answer) corresponding to another operating condition in which the network (NW) is available to establish the connection and the second terminal 2 is available to run the application.

According to a particular embodiment, each local communication device 4 and 4' may have a IP public address that can be static or dynamic. In the former case the address can be assigned by the first access node A1 via a protocol (as an example, a Dynamic Host Configuration Protocol-DHCP) suitable to assign dynamic IP addresses to devices on the network NW every time they are connected to the same network.

Advantageously, the network system 100 may include a centralized data-base RPST on which the public IP addresses are registered with symbolic names. The data-base may include also the kind of applications belonging to the local communication devices 4, 4'.

Each user of the service implemented on the communication system 100 may consult such centralized data-base to get information about both the local communication device address and the associated user applications.

The operation of the communication system 100 will be described also with reference to the time-space diagram of FIG. 2, in which are schematized under the form of functional blocks: the first and second application sections 3 and 3', the first and second local communication devices 4 and 4', a terminal-based server 17 (TBS) and a network based server 18 (NBS).

The terminal based-server 17 (which may be a centralized control elaborating device of the network NW or may correspond to elaboration resources distributed along the network NW) is a hardware/software entity that is dedicated to initiate, manage and terminate applications sessions across a communication networks (via the terminal-based signaling). In other words, the terminal-based server 17 operates on the so called Terminal Based Signaling Communication Network (TB SCN).

The network based-server 18 (which may be a centralized control device of the network NW or may correspond to elaborating resources distributed along the network NW) is a hardware/software entity that is dedicated to the managing of the signals belonging to the network-based signaling. In other words, the network-based server 17 operates on the so called Network Based Signaling Communication Network (NB SCN). Particularly, the network based-server 18 allows to respond to the signals requesting the availability of the network nodes to establish a connection to be set up in accordance with specific requirements.

According to the example described, both the terminal based-server 17 and the network based-server 18 are configured to route the first terminal based signal ST1 and the first network-based signal SN1 from the first terminal 1 to the second terminal 2.

With reference to the operation of the communication system 100, it is considered the particular case in which, the user (caller) of the first terminal 1 whishes to run a specific multi-media application, such as a video-conference, with the user (called) of the second terminal 2.

Subsequently, the first application section 3 performs a call, that is to say generates the local terminal-based signal S1, which includes (explicitly or implicitly) a request for a connection with the second terminal 2. This local terminal-based signal S1 is received by the first elaborating device 7 which, if said signal S1 is not in accordance with the specific terminal-based protocol employed, will process it by means of the first terminal-based module 8.

However, the first elaborating device 7 generates and transmits (as an example, through the first transceiver 13) the first terminal-based signal ST1 that reaches the first access node A1 and is managed by the terminal-based server 17. Particularly, the first elaborating device 7 extracts from the local terminal-based signal S1 the application parameters and the connection parameters (such as the ones above defined), requested by the first application section 3 to run the multi-media application.

Advantageously, such first terminal-based signal ST1 carries additional identification information which associates it to the specific call performed by the first local communication 4. This identification information may be a code (e.g. an alphanumeric string) managed by the terminal-based signaling.

Moreover, after receiving the local terminal-based signal S1, the first elaborating device 7 (for example, through of the first network-based module 9 and the first transceiver 13) generates the first network-based signal SN1 and transmits it to the first access node A1. The first network-based signal SN1 contains the network parameters which the first application section 3 requires in order to set up a connection with the second terminal 2 supporting the multi-media application to be run. This first network-based signal SN1 is managed by the network-based server 18.

Advantageously, such first network-based signal SN1 carries an additional identification information which allows to associate it to the first terminal-based signal ST1 corresponding to the same call. The identification information carried by the first network-based signal SN1 is, preferably, the same code carried by the first terminal-based signal ST1 and is managed by the network-based signaling.

On the basis of the first network-based signal SN1, the network-based server 18 verifies if the nodes of the network NW are available to set up the connection according to the requested parameters. The example illustrated in FIG. 2 refers to a first operating condition in which the network-based server 18 ensures that such connection can be set up.

With reference, for example, to the GMPLS protocol, the first network-based signal SN1 produces the predisposition of each node of the network NW (for example, the nodes A1, N1, N2, A2) to the connection to be established. Particularly, the predisposition of the nodes is a reservation of the nodes resources to maintain the nodes free in order to subsequently set up only the connection associated to the specific call. In this case, the first network-based signal SN1 is forwarded towards the network-based server 18 and, thanks to the availability of the network, reaches the second terminal 2.

Therefore, according the example given, the reaching of the first network-based signal SN1 at the second local communication device 4' allows to inform the second device 4' of the availability of the network NW to set up the connection.

Moreover, the first terminal-based signal ST1 reaches the second communication device 4', which forwards the associated requesting message to the second application section 3' under the form of a local requesting terminal based signal S1'.

The second application section 3' verifies its availability to run the application and, as an example, verifies if the peripheral equipments 20' are busy or are free to run the application. Moreover, the second application section 3' verifies if the peripheral equipments 20' are suitable to run that particular type of application requested by the first terminal 1.

In accordance with the operating condition considered, the second application section 3' verifies its availability to run the application, and generates a response local signal SR1', carrying an availability information (i.e. a positive answer, OK), and sends this response local signal SR1' to the second elaborating device 7'. The response local signal SR1' carries the above mentioned identification information associated to the specific call.

Moreover, the second local communication device 4' sends a terminal-based response signal ST' to the terminal-based server 17 which transmits a final terminal-based response signal STR to the first local communication device 4, carrying the positive answer.

Preferably, at the receiving of the first one between the first terminal-based signal ST1 and the first network-based signal SN1 (for example, the signal ST1), the second elaborating device 7' starts a waiting period (for example, by starting a timer device) having a pre-established duration. According to the exemplificative condition described, within such waiting period the second elaborating device 7' is informed about the receiving of the other signal (for example, the first network-based signal SN1) carrying the same identification information at the second communication device 4'.

In this case, the second elaborating device 7' performs a logical combination (step SIG-ELAB of FIG. 2) of the response local signal SR1' and the first network-based signal SN1 or, in other words, combines the availability information carried (explicitly or implicitly) by the two signals SR1' and SN1. It has to be observed that two signals SR1' and SN1, combined by the second elaborating device 7', refer to the same call as they have the same identification information.

In accordance with the particular operating condition considered, the second elaborating device 7' generates a response signal SR which carries an information having a value (positive answer, OK) corresponding to the availability of the network NW to establish the connection and to the availability of the second application section 3' to run the application.

Particularly, this response signal SR is a signal belonging to the network-based signaling. Moreover it has to be noticed that response signal SR carries an information also connected to the terminal-based signaling and not only to the network-based signaling. Therefore, the second terminal 2 acts as a network node since it produce signals operating at the network-based signaling level.

The second local communication device 4' sends the response signal SR to the network-based server 18 which forwards a corresponding network-based response signal SRN towards the first local communication device 4 carrying a positive answer. The network-based server 18, on the basis of said response signal SRN, provides for configuring all the nodes previously reserved in order to effectively establish the connection. When the first local communication device 4 receives the network-based response signal SRN the connection has been set up (step ST-UP of FIG. 2). Consequently, the first local communication device 4 sends to the first application section 3 a further local response signal SR1 carrying the positive answer.

The first local communication device 4 may start the running (step RN-AP, in FIG. 2) of the multi-media application and exchanging data DS with second terminal 2, by means of the established connection on the network NW.

Figure 2:
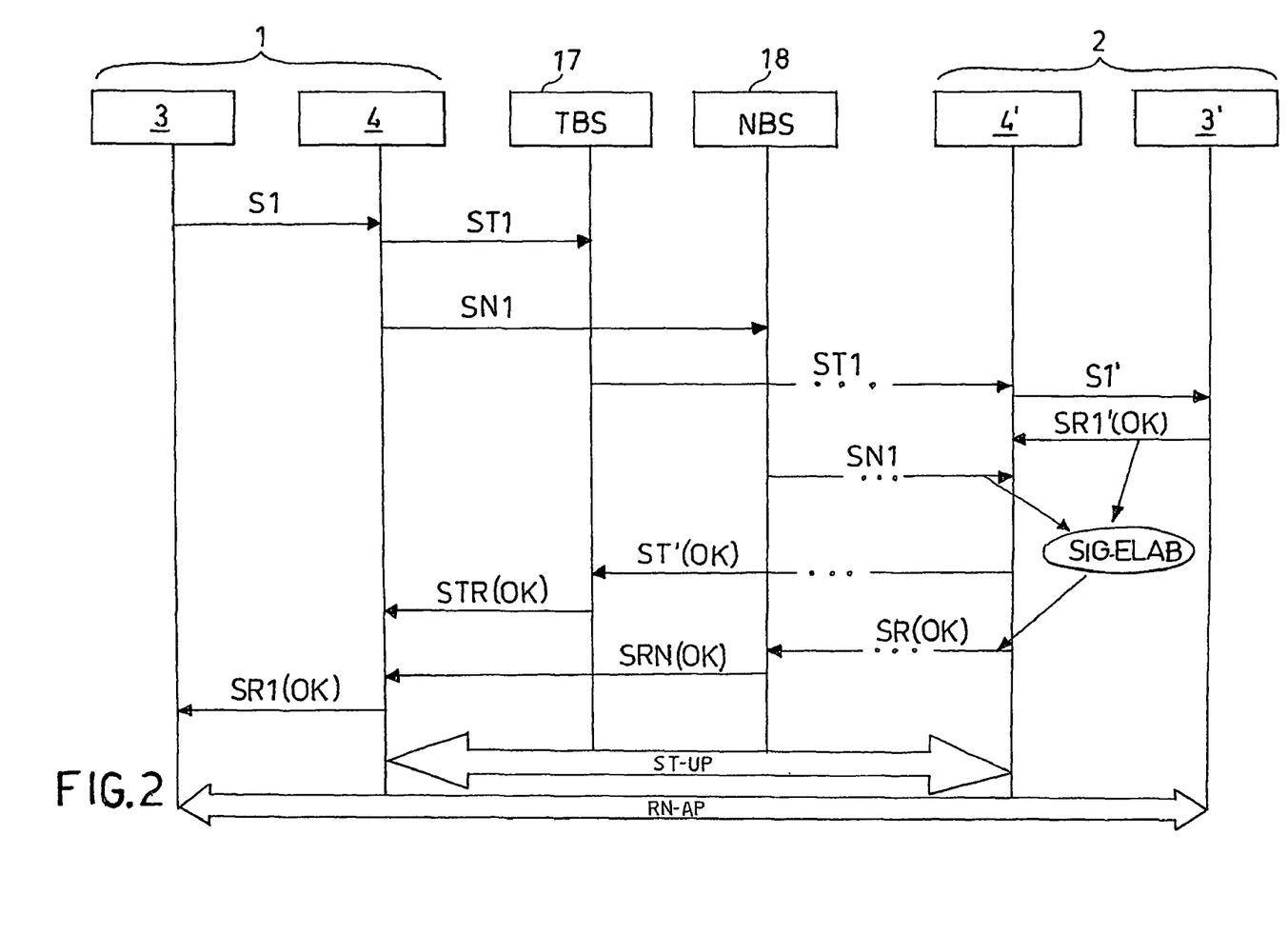
FIGS. 2-6 illustrate by means of time-space diagrams the managing of a network-based signaling and a terminal-based signaling in said system, in accordance with different operating conditions.
Figure 3:
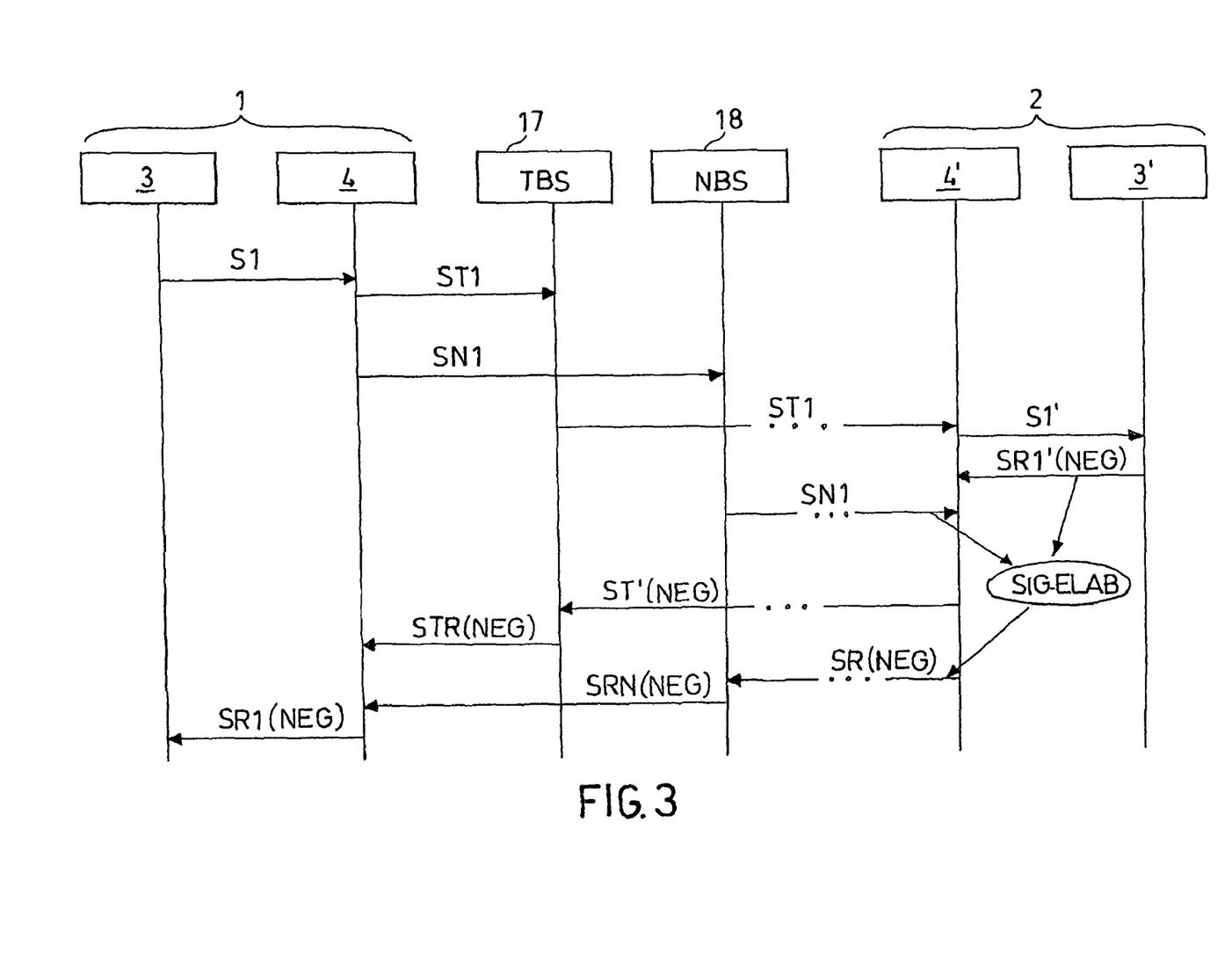

FIG. 3 refers to a second operating condition in which the second application section 3' is unavailable to run the multi-media application requested by the first terminal 1. For example, this is the case in which the second application section 3' is busy, is not activated or is, not able to support that particular type of application. Therefore, FIG. 3 differs from FIGS. 2 only for the response signals generated at the second terminal 2.

In greater detail, the response local signal SR1' carries a negative answer (NEG). The second elaborating device 7' is configured in such a way that, in this operating condition (i.e. the second application section 3' is not available to run the application) the response signal SR, resulting from the combination SIG-ELAB, carries an information corresponding to a negative answer. Even if the response signal SR has been generated by the second terminal 2 and not by a node of the network NW, it is received by the network-based server 18 and recognized as signal belonging to the network-based signaling. Therefore, the network-based server 18 generates and forwards to the first terminal 1 a network-based response signal SRN carrying a negative answer. In this case, all the resources of nodes, previously reserved in order to set up the connection, are released, i.e. the reservation is canceled and no set up of the connection is carried out.

It has to be notices that providing the local communication devices 4 and 4' with the possibility to receive and produce network-based signals corresponds to the fact that such local communication devices (which are "end" terminals) virtually acts as network nodes and, in particular, as Label Switch Routers LSRs.

In addition, the terminal-based response signal ST', the final terminal-based response signal STR, the further positive local response signal SR1 carry a negative answer, indicating the unavailability to run the application of the second application section 3'. Therefore, the first terminal 1 does not act to run the multi-media application. The user of the first terminal is informed by the first application section 3 that the connection cannot be established and will decide, for example, to again attempt to set up the connection or to connect another user.

Figure 4:
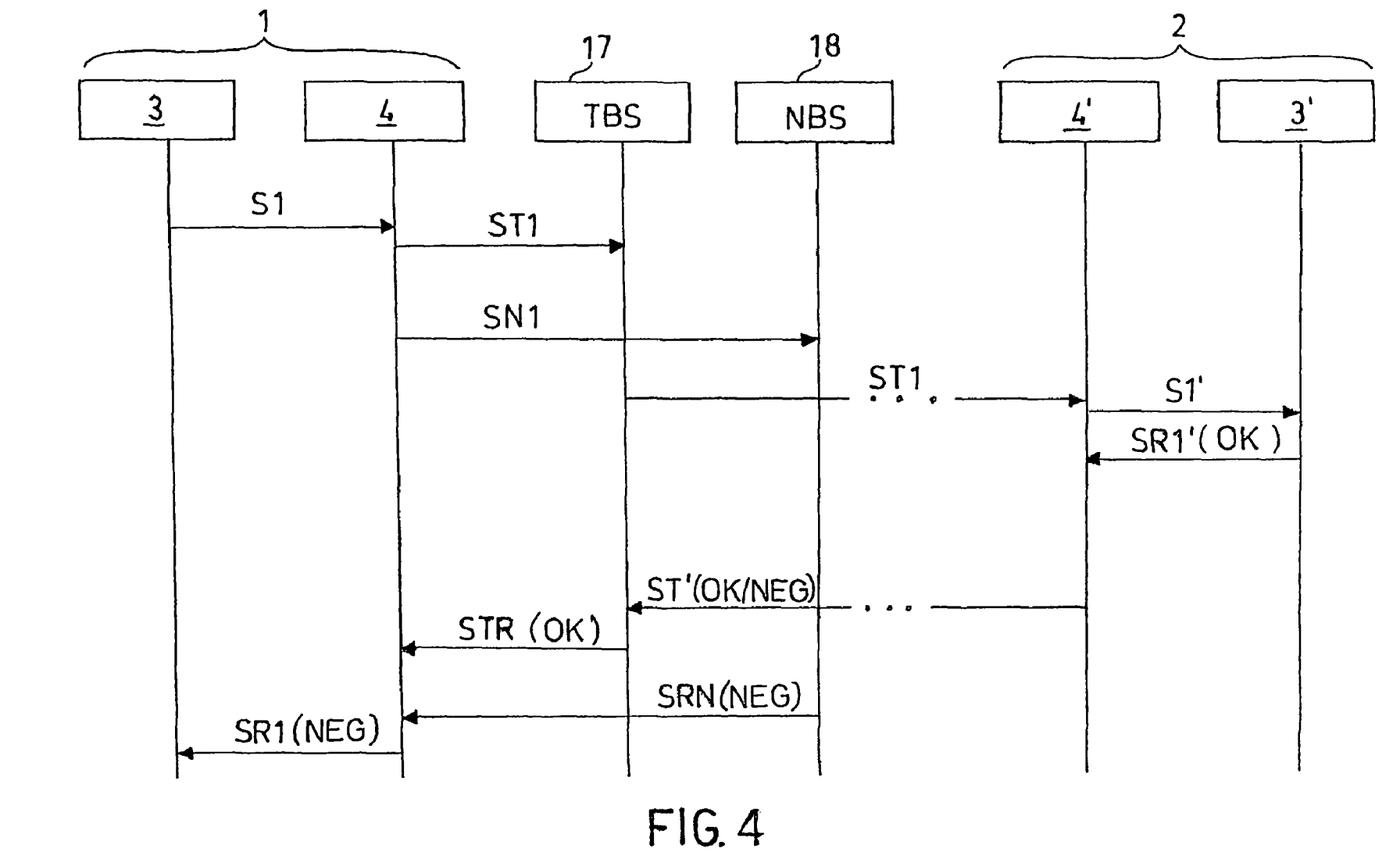

Hereinafter, with reference to FIG. 4, it is described the operation of the system 100 in a third condition in which a node of the network NW (such as, for example, the metro-node N1) does not operate (as, for example, it is idle). In this condition, the network-based signaling from the first terminal 1 to the second terminal 2 cannot be performed.

As already described with reference to FIG. 2, the first application section 3 generates the local terminal-based signal S1 and the first elaborating device 7 generates and transmits the first terminal-based signal ST1, which reaches the first access node A1 and is managed by the terminal-based server 17.

Moreover, after receiving the local terminal-based signal S1, the first elaborating device 7 generates the first network-based signal SN1 and transmits it to the first access node A1. The first access node A1 receives such first network-based signal SN1 and attempts to forward it towards the metro-node N1 which does not operate.

The second terminal 2 does not receive the network-based signaling and cannot successfully send on the network NW response signals belonging to the network-based signaling.

In this case, in accordance with conventional network-based signaling protocol implemented, the server 18 sends to the first local device 4 a network-based response signal SNR carrying a negative answer, which avoids the setting up of the connection. On the bases of such negative answer carried by the signal SNR, the first terminal 1 does not attempt (SNR1-NEG) to run the application, independently on the content of the terminal-based signaling.

It has to be noticed that the above described third condition is analogous to the one in which the second local communication device 4' does not operate since, for example, it is deactivated. In this case, both the network-based server 18 and the terminal-based server 17, which deal with the second local communication device 4' as both a network node and a terminal, will detect the status of the second local communication device 4' and will send to the first local communication device 4' negative answers: the network-based response signal SNR and the terminal-based response signal ST' carry negative answers.

The network-based response signal SNR causes the releasing of the reservation of the intermediate network nodes, avoiding the setting up of the connection.

Figure 5:
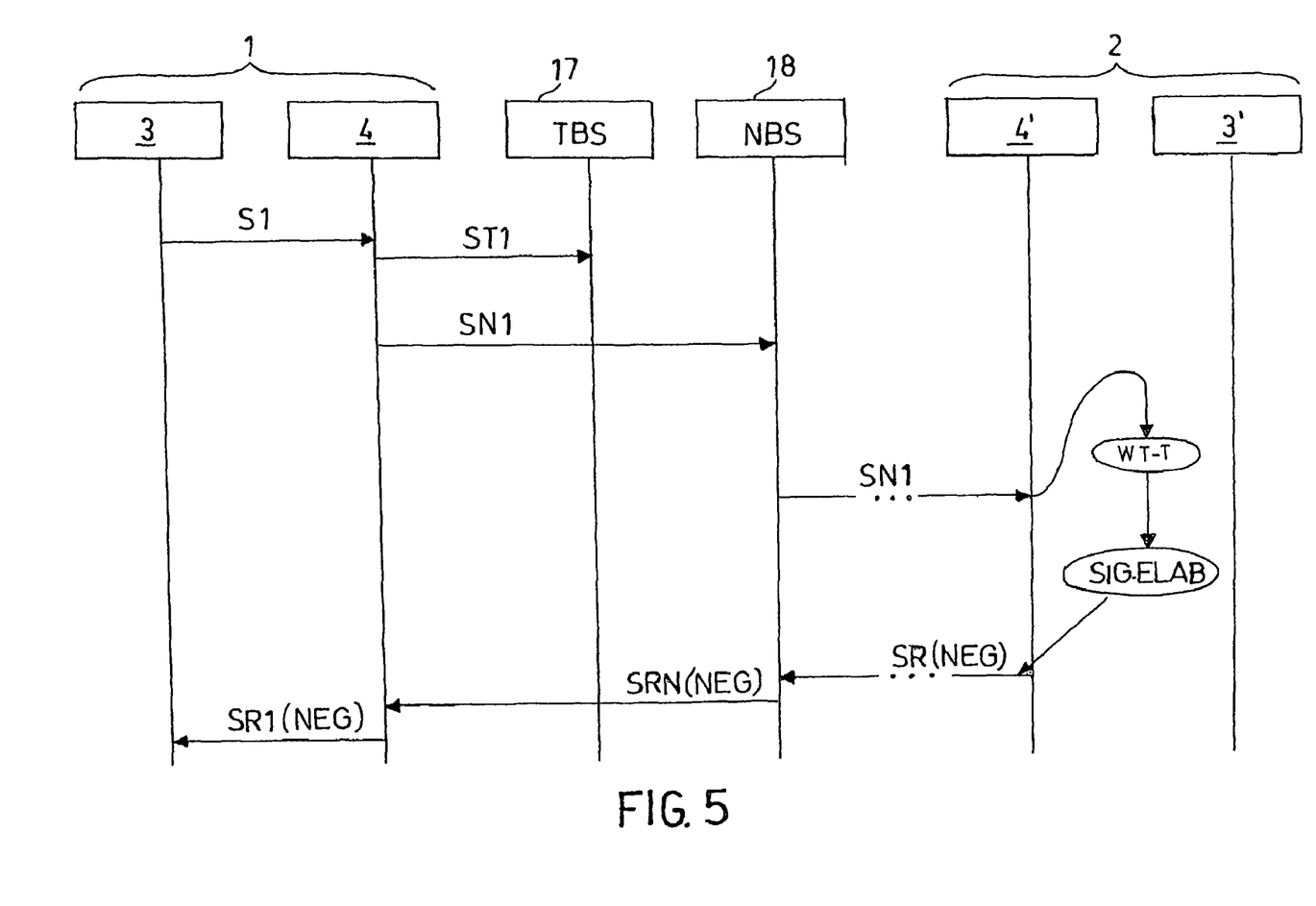

According to another operating condition described with reference to FIG. 5, the terminal-based signaling cannot perform in a complete manner as one of the nodes of the network cannot manage correctly the terminal-based signaling. This condition is detected by the terminal-based server 17. The network-based signaling occurs regularly, i.e. the first network-based signal SN1 reaches the second local communication device 4', but no terminal-based signals reach such second local device 4'.

The second elaborating device 7' when receives the first network-based signal SN1 starts to wait (step WT-T of FIG. 5) for the pre-established duration (e.g. 1 sec or 10 msec).

Since within the waiting period no signal belonging to the terminal-based signaling concerning that specific call is received, the second local communication device 4' generates a response signal SR carrying a negative answer. The network-based server 18 generates a network-based response signal SRN carrying a negative answer and transmits it towards the first terminal 1.

Analogously to the case of FIG. 2, the network-based response signal SRN sent towards the first terminal 1 causes the release of the node resources reserved and, consequently, a connection on the network NW is not established. In this operating condition, if the terminal-based server 17 is active it will send to the first terminal a corresponding signal (not shown in FIG. 5), belonging to the terminal-based signaling, carrying a negative answer.

The above described operation examples, refer to the case in which the network-based signaling occurring between the first terminal 1 (acting as caller) and the second terminal 2 (acting as called) provides for an initial reservation of the node resources of the network NW. According to the above examples, the reservation is confirmed (configuration of the nodes and set up of the connection) or is released in subsequent steps, i.e. when the network-based response signal SRN is transmitted. This behavior is compatible with a GMPLS protocol.

However, the present invention can be also implemented by means of other types of protocols. For example, the network NW may be a circuit-switched network, such as the Public Switched Telephone Network PSTN, implementing an ISDN (Integrated Services Digital Network) service or a POTS (Plain Old Telephone Service) service. For example, this network NW may use as network-based signaling, the protocol SS7, Signaling System number 7 and may be provided with a proprietary terminal-based signaling protocol.

Figure 6:
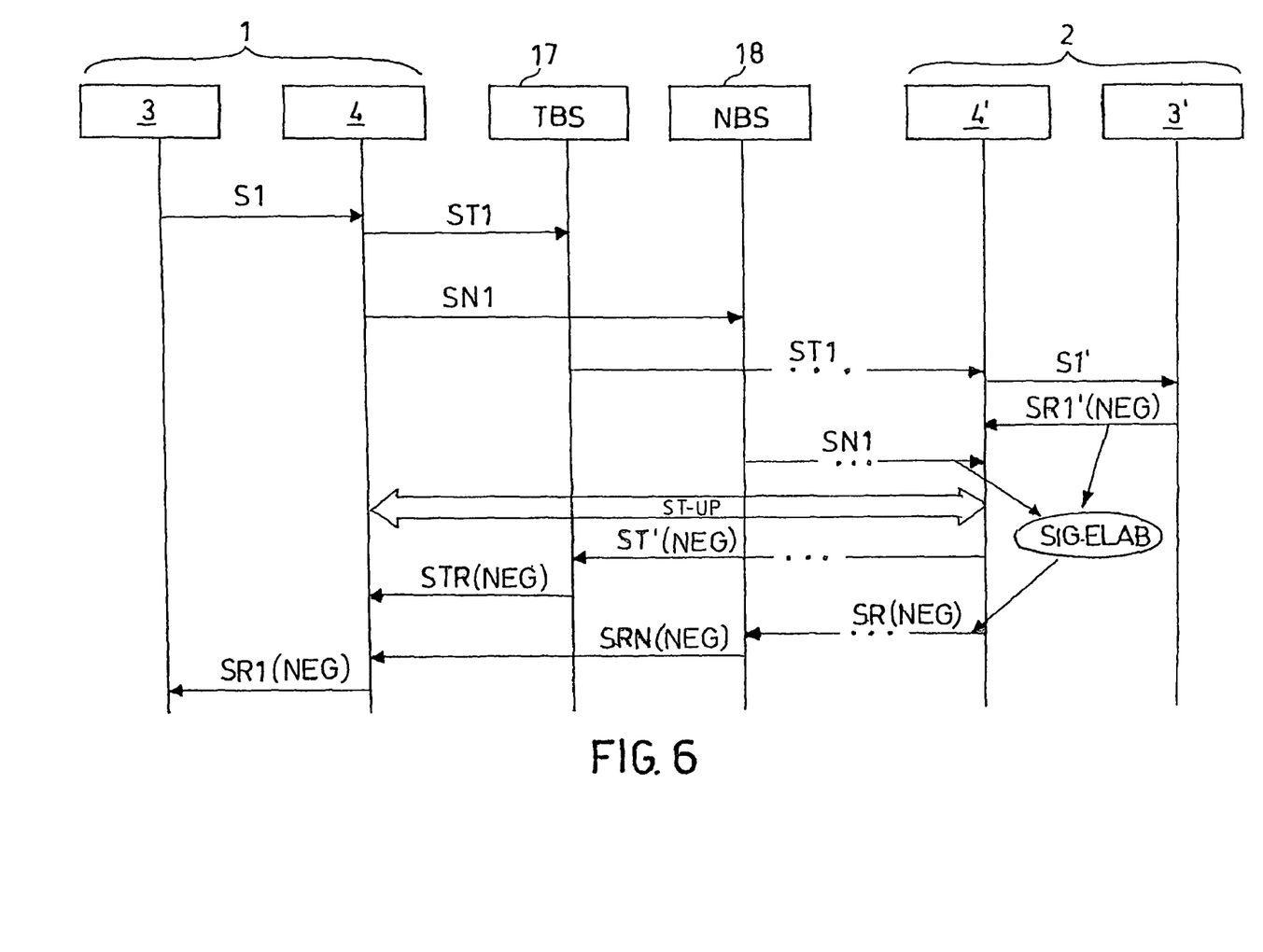

With reference to FIG. 6, it has been considered an operating condition analogous to the one of FIG. 3. The first terminal 1 calls the second terminal 2 and the network-based server 18, by means of the first network-based signal SN1, performs a predisposition of each node interconnecting the first terminal 1 with the second terminal 2. In this case, the nodes interconnecting the first terminal 1 with the second terminal 2 are not simply reserved but their hardware/software resources are effectively configured in such a way that the connection is set up. In other words, all the necessary node resources are engaged and, when the network-based signal SN1 reaches the second terminal 2, the connection between the two terminals has been established (set up step, ST-UP in FIG. 6).

If the second application section 3' is not available to run the application (the response local signal SR1' is negative) the combination step (SIG-ELAB) will produce a response signal SR carrying a negative answer. The network-based server 18 generates a corresponding network-based response signal SRN carrying negative value and, therefore, suitable to release (i.e. to tear down) the previously established connection. The connection is released and the first terminal 1 is informed that the application involving the second terminal 2 cannot be run.

Analogous considerations can be made in the case in that (similar to the one of FIG. 5) the network-based signaling can be fully managed, while the terminal-based signaling cannot be performed.

According to a further embodiment of the invention described with reference to FIG. 7, the first terminal 1 may collect parameters necessary to establish the connection and to run the application by data-bases SP-DB belonging to a Service Plane (SRV-P).

In general, the Service Plane is an Information Technology Platform comprising software and/or hardware resources that allow creating, provisioning, managing, billing, etc., services for fixed and mobile customers. The Service Plane, in order to exploit its functionalities, may interact with the Operation Support Systems (OSS), Business Support Systems (BSS) and Control Plane of the telecommunication network.

Figure 7:
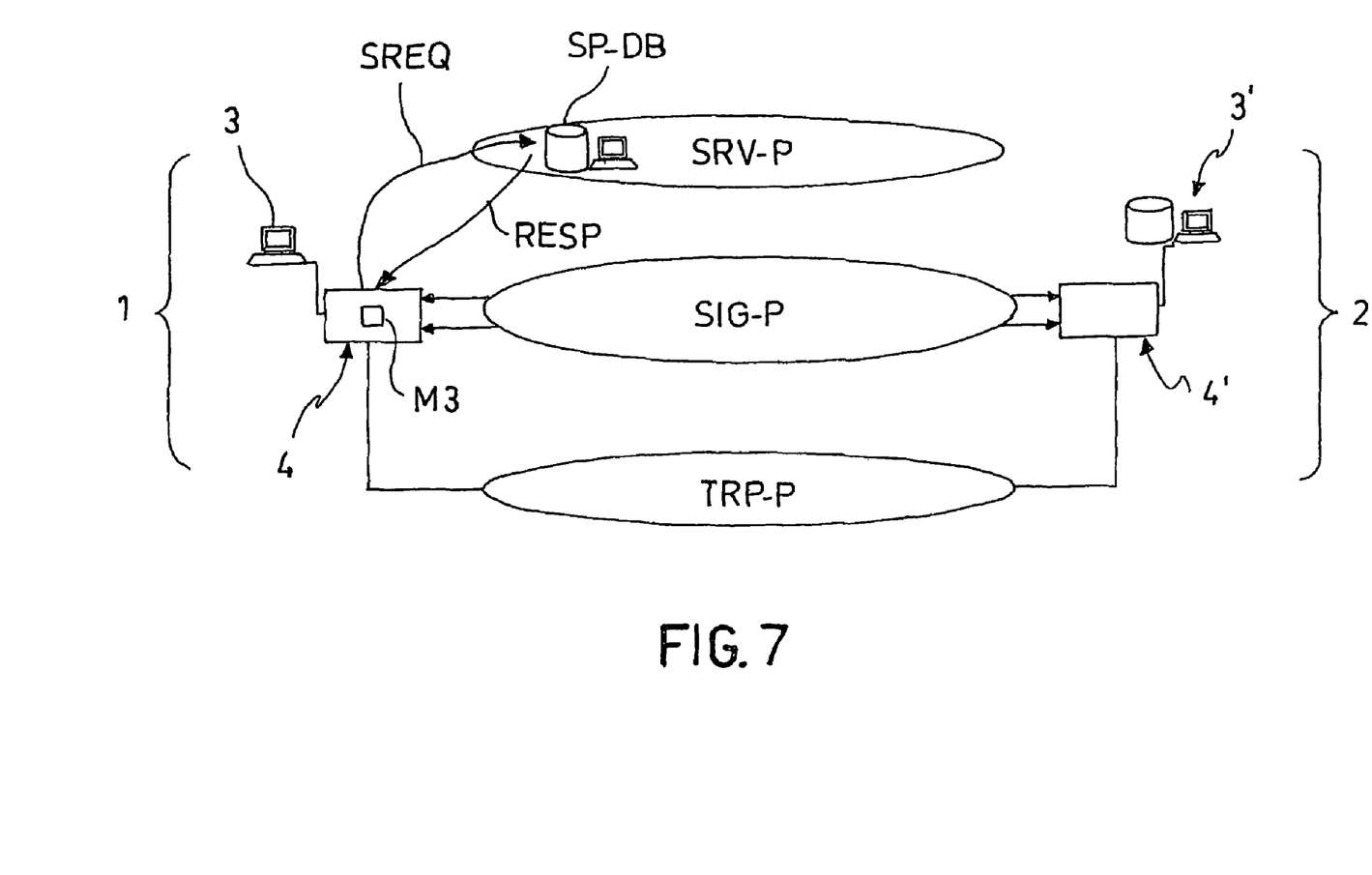
FIG. 7 illustrates schematically a communication system in accordance with a further embodiment of the invention.

With reference to FIG. 7, the Service Plane SRV-P includes data-bases SP-DB (e.g. repository with information about users and services) and intelligent nodes (e.g. application servers) equipped with functionality for the creation and integration of services and applications. For example, the database RSPT shown in FIG. 1 may be included in the Service Plane.

FIG. 7 shows an example of connection services requested by the first terminal 1.

Specifically, the first local communication device 4 sends to the Service Plane SRV-P (via a proper protocol) an abstract service request SREQ. As an example, a service request may be the request of a connection to the second terminal 2 acting as content server for a particular video (VoD) to be provided on-demand.

Then, the intelligent nodes of the Service Plane SRV-P process such service request; after that processing, a proper response RESP (regarding the service logic creation) is sent back to the first local communication device 4.

The first local communication device 4 finally elaborates this response RESP and starts the procedure above described, including the terminal-based and network-based signaling. It is possible that the answer sent by the Service Plane is not directly addressed to fill all the field in both terminal based and network based signaling, but the caller device need a further elaboration to provide correctly the call via signaling. The Signaling Plane managing the terminal-based and network-based signaling has been indicated in FIG. 7 by the reference symbol SIG-P. The control and management planes of the communication network (Transport Plane, TRP-P) cooperate for activating the requested services.

In addition to the first terminal-based module 8 (M1) and the first network-based module 9 (M2) shown in FIG. 1, the first local communication device 4 can be provided with a module M3 for interfacing with the Service Plane SRV-P (i.e. for sending abstract service requests, receiving response from the Service Plane) and for optionally elaborating the response received (from the Service Plane) in order to generate proper network-based and terminal-based signaling.

In operation, this module M3 equipping the first local communication device 4 contacts the intelligent server of the Service Plane (e.g. via an IP connection) which, after the analysis of the request, answers with a set of parameters (e.g. destination address, type of application, QoS parameters, etc.) suitable for generating the terminal-based and the network-based signaling for set-up a connection.

As clear from the above, the method described shows the advantage of managing the network resources in an efficient manner. This advantage is connected to the fact that the local communication device (as the ones 4 and 4') coupling terminal-based and network-based signaling capability allows to manage the operations regarding the establishing of connections only when both the communication network and the application terminals are available. The connection between the two terminals 1 and 2 is definitively set up only when the second application section 3' of the second terminal 2 (i.e. the terminal answering to the request of the first terminal) is available to run the application.

Therefore, a useless reservation and an expensive engaging of the network resources due to a connection that has to be immediately torn-down as not employable can be completely avoided.

Moreover, the use of a GMPLS approach shows relevant advantages as it may provide, rapidly and friendly, connection-oriented LSPs meeting the requirements of multi-media interactive applications.

The invention claimed is:

1. A method of controlling establishing of a connection between at least a first and a second terminal on a communication network, comprising:

sending on the network and toward the second terminal a network signal requesting the network availability to establish said connection and a terminal signal requesting the availability of the second terminal to run an application exchanging data between said first and second terminals;

in a first operating condition, receiving at the second terminal the network signal and the terminal signal;

generating at the second terminal an application response signal representative of the availability/unavailability of the second terminal to run the application;

elaborating at the second terminal, the network signal and the application response signal so as to generate a response signal carrying information indicative of the availability/unavailability of the network to establish the connection combined with the availability/unavailability of the second terminal to run the application; and sending said response signal on the network toward the first terminal, wherein said information assumes a first value corresponding to a first state of said first operating condition in which the network is available to establish the connection and the second terminal is unavailable to run the application, in such first state and comprising releasing of the connection by sending on the network the response signal carrying the first value.

2. The method according to claim 1, wherein said network comprises a plurality of nodes to be employed for carrying out the connection, and further comprising predisposing to the connection the plurality of nodes by means of said network signal sent to the second terminal.

3. The method according to claim 2, wherein said information assumes a second value corresponding to a second state of said first operating condition in which the network is available to establish that the connection and the second terminal is available to run the application, and in such second state comprising establishing of the connection by sending on the network the response signal carrying the information assuming the second value.

4. The method according to claim 2, wherein said predisposition comprises reservation of the nodes resources for the connection.

5. The method according to claim 2, wherein said predisposition comprises configuration of the nodes resources for the connection.

6. The method according to claim 1, further comprising:
receiving said information at the first terminal, the information having the second value; and
running the application at the first and the second terminals.

7. The method according to claim 1, comprising, after having received at the second terminal one between the network signal and the terminal signal, waiting for the other signal between the network signal and the terminal signal, the waiting being performed in a time period having a pre-established duration.

8. The method according to claim 1, comprising the generation of the response signal in which the information assumes the first value also in a second operating condition in which the network is available to establish the connection and the terminal signal does not reach the second terminal within such pre-established duration.

9. The method according to claim 7, wherein the network signal and the terminal signal carry a same identification information associated with a specific connection to be established and a specific application to be run.

10. The method according to claim 2, wherein said plurality of nodes comprises access nodes, metro nodes, or core nodes.

11. The method according to claim 1, wherein said application to be run on the first and second terminals comprises broadband application.

12. The method according to claim 1, wherein said application is an interactive application.

13. The method according to claim 1, wherein said application is a multimedia application.

14. The method according to claim 1, wherein said application comprises at least one of the following applications: video-conference, multi-media gaming, or tele-presence.

15. The method according to claim 1, further comprising:
generating a first application requesting signal by a first application section of said first terminal; and
elaborating said application request signal at a first elaborating device of said first terminal for generating the terminal signal.

16. The method according to claim 15, further comprising:
receiving at the first elaborating device said first application requesting signal; and
elaborating said first application requesting signal at the first elaborating device for generating the first signal.

17. The method according to claim 1, wherein the generation of the application response signal comprises:
receiving at a second elaborating device of said second terminal the terminal signal;
elaborating at the second elaborating device the terminal signal and sending to a second application section of the second terminal a second application requesting signal;
generating at the second application section the application response signal responding to the second application requesting signal;
sending the second application response signal to the second elaborating device; and
elaborating at the second elaborating device the application response signal and the network signal.

18. The method according to claim 1, wherein the network signal and the response signal are adapted to interact with a network-based control plane.

19. The method according to claim 1, wherein the terminal signal is adapted to interact with a terminal-based control plane.

20. The method according to claim 1, wherein the network signal carries network data corresponding to parameters of the connection to be set up.

21. The method according to claim 1, wherein the terminal signal carries application data corresponding to parameters of the application to be run.

22. The method according to claim 21, comprising the receiving at the first terminal of said application data from an external data-base, external to said first terminal.

23. The method according to claim 22, wherein said external database belongs to a service plane of the network.

24. A communication device connectable to a requesting communication device by means of a communication network, comprising:
a receiver adapted to be connected to the network for receiving, in a first operating condition, a network signal indicating the network availability to establish said connection and a terminal signal requesting the availability to run an application exchanging data between the communication device and the requesting device, comprising:
an elaborating device associated with the receiver adapted to receive an application response signal representative of the availability/unavailability of the communication device to run the application, the elaborating device being further adapted to elaborate the network signal and the application response signal so as to generate a response signal carrying information indicative of the availability/unavailability of the network to establish the connection combined with the availability/unavailability of the communication device to run the application; and
a transmitter associated with the elaborating device for sending on the network and toward the requesting device the response signal,
wherein said information is capable of assuming a first value corresponding to a first state of said first operating condition in which the network is available to establish the connection and the communication device is unavailable to run the application, in such first state the response signal being suitable to produce the releasing of the connection.

25. The communication device according to claim 24, wherein said information is capable of assuming a second value corresponding to a second state of said first operating condition in which the network is available to establish the connection and the communication device is available to run the application.

26. The communication device according to claim 25, wherein said response signal carrying the second value is suitable to produce the establishing of the connection.

27. The communication device according to claim 24, further comprising an application section associated with said elaborating device for running said application, said application section being further capable of generating said application response signal.

28. The communication device according to claim 27, wherein the receiver, the elaborating device and the transmitter are housed in a first container separated from a second container housing part of the application section, the first and second container being provided with interconnecting lines for the exchanging of signals.

29. The communication device according to claim 27, wherein the receiver, the elaborating device, the transmitter and the application section are housed in a common container.

30. The communication device according to claim 27, wherein said application section comprises apparatuses for the execution of interactive multimedia applications.

31. The communication device according to claim 27, wherein said application section is adapted for the execution of interactive applications.

32. A communication system comprising a first terminal, a second terminal and a communication network for establishing a connection between the first and the second terminals, the second terminal comprising:
a receiver connected to the network for receiving a network signal indicating the network availability to establish said connection and a terminal signal requesting the availability to run an application exchanging data between the first and the second terminal;
the second terminal comprising:
an elaborating device associated with said receiver adapted to generate an application response signal representative of the availability/unavailability of the second terminal to run the application; the elaborating device being adapted to elaborate the network signal and the application response signal so as to generate a response signal carrying information indicative of the availability/unavailability of the network to establish the connection combined with the availability/unavailability of the second terminal to run the application; and a transmitter associated with the elaborating device for sending on the network and toward the first terminal the response signal carrying said information, wherein said network comprises a plurality of nodes predisposed for carrying out the connection, when said information is capable of assuming a first value corresponding to a first operating state in which the network is available to establish the connection and the second terminal is unavailable to run the application, in such first state said response signal being suitable to produce the releasing of the connection.

33. The system according to claim 32, wherein said information is further capable of assuming a second value corresponding to a second operating state in which the network is available to establish the connection and the second terminal is available to run the application.

34. The system according to claim 33, wherein said response signal carrying the second value is suitable to produce the establishing of the connection.

35. The system according to claim 32, wherein the predisposed nodes have resources reserved for the connection.

36. The system according to claim 32, wherein the predisposed nodes are configured for the connection.

37. The system according to claim 32, wherein the network signal and the response signal are configured in accordance with a network-based signaling protocol and the terminal signal is configured in accordance with a terminal-based signaling protocol.

38. The system according to claim 37, wherein the network-based signaling protocol is resource reservation protocol-traffic engineering.

39. The system according to claim 37, wherein the terminal-based signaling protocol is session initiation protocol.

40. The system according to claim 32, wherein said network is configured in accordance with at least one of the following communication technologies: connection-oriented circuit-switched network, or connection-oriented packet-switched network.

41. The system according to claim 40, wherein said Connection-oriented packet-switched network is configured in accordance with one of the following technologies: frame relay, multiprotocollabel switching, asynchronous transfer mode or generalized multiprotocol label switching.

42. The system according to claim 40, wherein said connection-oriented circuit-switched network is configured in accordance with one of the following technologies: synchronous digital hierarchy, time division multiplexing, optical transport network, or generalized multiprotocol label switching.

* * * * *